(12) United States Patent
Martin et al.

(10) Patent No.: US 7,975,042 B2
(45) Date of Patent: Jul. 5, 2011

(54) METHOD FOR ADAPTING AN INTERNET WEB SERVER TO SHORT-TERM CHANGES IN DEMAND

(75) Inventors: Michael Christopher Martin, Canton, GA (US); Patrick James Richards, Jr., Marietta, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 2637 days.

(21) Appl. No.: 09/846,568

(22) Filed: May 1, 2001

(65) Prior Publication Data

US 2002/0165909 A1    Nov. 7, 2002

(51) Int. Cl.
  *G06F 15/16* (2006.01)
(52) U.S. Cl. .. 709/224; 715/736; 709/217; 707/999.007
(58) Field of Classification Search .................. 709/224, 709/223, 219, 225, 226, 217; 711/134, 158, 711/133; 713/201; 715/736; 707/999.007, 707/10

See application file for complete search history.

(56) References Cited

U.S. PATENT DOCUMENTS

| | | | |
|---|---|---|---|
| 5,727,129 A | 3/1998 | Barrett et al. ................... 395/12 |
| 5,732,240 A | 3/1998 | Caccavale ..................... 395/445 |
| 5,878,384 A | 3/1999 | Johnson et al. ............... 702/187 |
| 5,881,231 A | 3/1999 | Takagi et al. ............ 395/200.42 |
| 5,892,917 A * | 4/1999 | Myerson ........................ 709/224 |
| 5,920,700 A | 7/1999 | Gordon et al. ........... 395/200.56 |
| 5,935,207 A | 8/1999 | Logue et al. .................. 709/219 |
| 5,964,839 A | 10/1999 | Johnson et al. ............... 709/224 |
| 6,012,126 A * | 1/2000 | Aggarwal et al. ............. 711/133 |
| 6,026,413 A | 2/2000 | Challenger et al. ........... 707/202 |
| 6,067,565 A | 5/2000 | Horvitz ......................... 709/218 |
| 6,085,226 A | 7/2000 | Horvitz ......................... 709/203 |
| 6,144,962 A | 11/2000 | Weinberg et al. ................ 707/10 |
| 6,148,332 A | 11/2000 | Brewer et al. ................. 709/218 |
| 6,415,368 B1 * | 7/2002 | Glance et al. ................. 711/158 |
| 6,425,057 B1 * | 7/2002 | Cherkasova et al. .......... 711/134 |
| 6,499,088 B1 * | 12/2002 | Wexler et al. ................. 711/152 |
| 6,546,422 B1 * | 4/2003 | Isoyama et al. ............... 709/225 |
| 6,546,473 B2 * | 4/2003 | Cherkasova et al. .......... 711/158 |
| 6,742,033 B1 * | 5/2004 | Smith et al. ................... 709/224 |
| 6,757,724 B1 * | 6/2004 | Fields et al. .................. 709/223 |
| 6,760,765 B1 * | 7/2004 | Asai et al. ..................... 709/226 |
| 6,775,695 B1 * | 8/2004 | Sarukkai ....................... 709/219 |
| 2002/0156881 A1 * | 10/2002 | Klopp Lemon et al. ....... 709/224 |
| 2002/0198882 A1 * | 12/2002 | Linden et al. ................... 707/10 |

(Continued)

FOREIGN PATENT DOCUMENTS

EP  0884870 A2  12/1998

(Continued)

OTHER PUBLICATIONS

U.S. Appl. No. 60/170,456.*

(Continued)

*Primary Examiner* — Jungwon Chang
(74) *Attorney, Agent, or Firm* — Anna Linne; Roberts Mlotkowski Safran & Cole, P.C.

(57) ABSTRACT

Servlets within a web server maintain state information concerning requests made by users of the server. The servlets associate each user with an HTTP session object. The session object is configured to include information that identifies the last-N web pages requested by the user. Periodically, or in response to a triggering event, the server analyzes the contents of the session objects, for example by tabulating the frequency with which each web page has been requested in the recent past. From the results of the analysis, web-page caching priorities are determined, and the contents of the server's cache are altered accordingly.

23 Claims, 3 Drawing Sheets

U.S. PATENT DOCUMENTS

2003/0041143 A1* 2/2003 Ronald et al. ............... 709/224
2003/0074580 A1* 4/2003 Knouse et al. .............. 713/201

FOREIGN PATENT DOCUMENTS

| JP | 2000-137642 | 5/2000 |
|---|---|---|
| JP | 2000-311135 | 11/2000 |
| JP | 2001-101212 | 4/2001 |

OTHER PUBLICATIONS

English language Abstract of JP 2000-137642.
English language Abstract of JP 2001-101212.
English language Abstract of JP 2000-311135.

* cited by examiner

METHOD FOR ADAPTING AN INTERNET WEB SERVER TO SHORT-TERM CHANGES IN DEMAND

FIELD OF THE INVENTION

The present invention relates to the field of the Internet, and more particularly to tracking real-time characteristics of an Internet web server's use and improving the performance of the server from a knowledge of these characteristics by altering its cache memory.

BACKGROUND

Internet users have come to expect nearly instantaneous response. Providing such responsiveness, particularly the responsiveness of web servers, depends on maintaining a favorable balance between resources and demands.

Resources to provide responsive Internet service have improved remarkably in the recent past. Faster processors and memories are available to both the users' workstations and the web sites' servers. Faster communication links are provided by optical fiber backbone transmission, cable-modem access, and asymmetric digital subscriber loop (ADSL) services.

Nevertheless, Internet responsiveness continues to be problematic, due to an ever-increasing burden that is placed on the Internet and on its web servers by an ever-increasing number of users and the ever-increasing sophistication of their demands. Moreover, patterns of Internet use may shift dramatically over a short time span, further complicating the problem of maintaining the delicate balance between resources and demands. For example, a breaking news story may lead to an avalanche of demand for related information, or halftime at a one sports event may lead to a flurry of queries for scores of other sports events ongoing at the same time, and so forth.

One way for a server to adapt to changing demand involves keeping and using logbooks that record past activities. Based on data kept in the logbooks, the server determines which web pages it should make readily available by storing in its cache memory rather than in its main memory. Unfortunately, logbooks of past activities are often large, cumbersome, and slow to adjust to short-term changes in web server demands. Consequently, when demand changes abruptly, the server is caught with the wrong pages stored in cache, and clients must endure delay while the server laboriously retrieves pages form main memory rather than from cache.

Thus, in view of the shortcomings associated with the use of logbooks and the desirability of providing responsive web servers, there is a need for a way of tracking nearly instantaneous changes in demands on web sites, so that web servers may adapt their cache memories to short-term demand changes and reconfigure their resources quickly, in order to provide the most responsive services possible.

SUMMARY OF THE INVENTION

The present invention provides a way in which a web site may adapt nearly instantaneously to changes in demand. According to one embodiment of the invention, servlets within the web server maintain state information concerning requests made by users of the server. The servlets associate each user with an HTTP session object. The HTTP session object is configured to include information that identifies the last-N web pages requested by the user's browser. Periodically, or in response to a triggering event, the server analyzes the contents of the HTTP session objects, for example by tabulating the frequency with which each web page has been requested in the recent past. From the results of the analysis, web-page caching priorities are determined, and the contents of the server's cache or the particulars of its caching algorithm are altered accordingly.

Thus, with the present invention, the server may reconfigure its resources quickly in response to abrupt changes in demand. These and other aspects of the present invention will be more fully appreciated when considered in the light of the following detailed description and drawings.

DETAILED DESCRIPTION OF THE INVENTION

Figure 1:
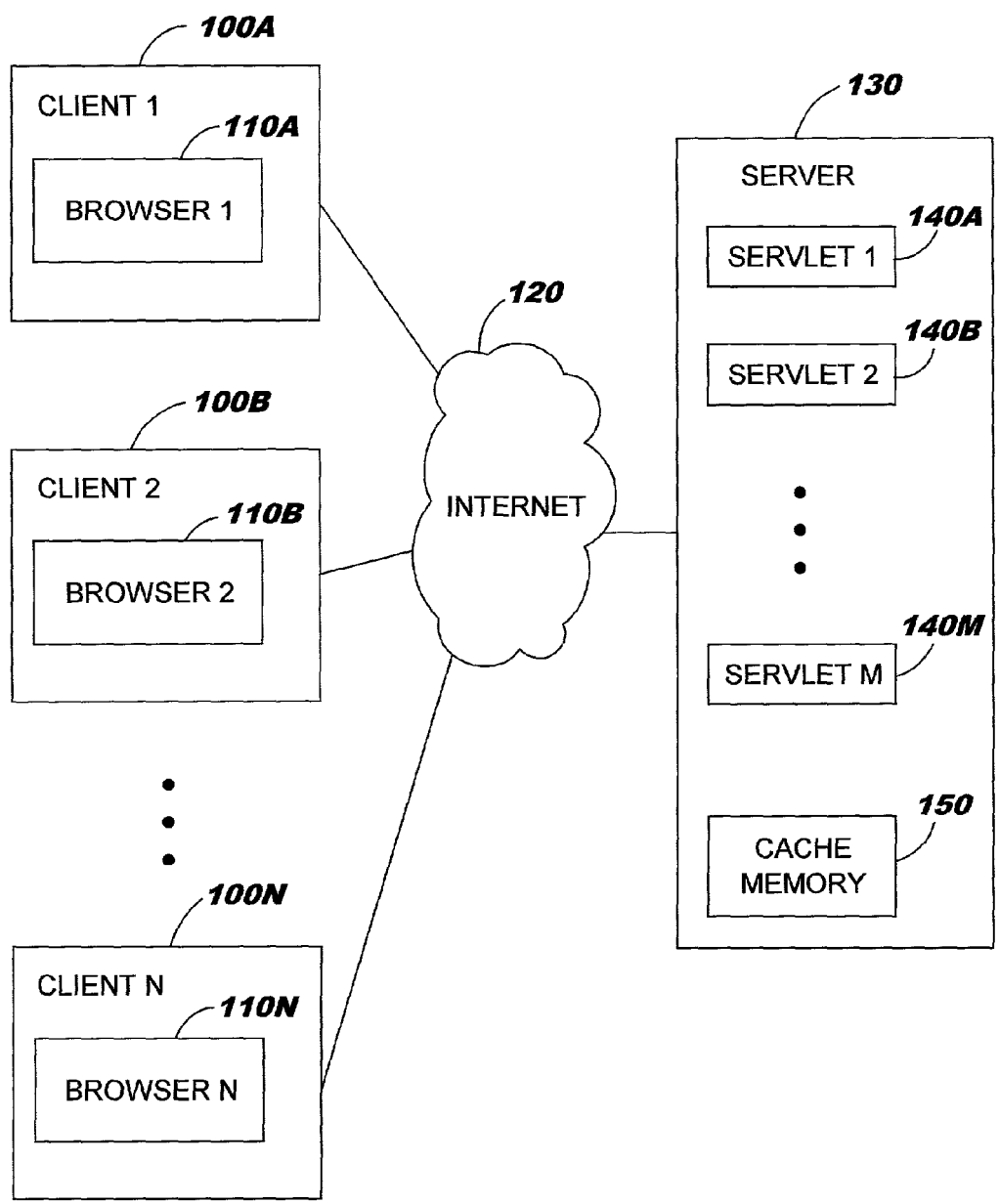
FIG. 1 shows a plurality of clients connected by the Internet to a web server.

The present invention, which enables an Internet web server to reconfigure its resources quickly in response to abrupt changes in demand, may be explained in the context of FIG. 1. In FIG. 1, a plurality of clients 100A through 100N are connected to an Internet web server 130 by the Internet 120 or by another communication network. Each of the clients 100A through 100N includes a web browser 110A through 110N. The server 130 includes a plurality of servlets 140A through 140M, which may be Java applets that run on the web server. The server 130 also includes a caching algorithm and a fast memory cache 150, which holds web pages that are expected to be accessed shortly, in order to provide the clients 100A through 100N with responsive service.

The cache 150 has finite size, however, and not all web pages that might conceivably be requested by the browsers 110A through 110N will fit into the cache 150. Consequently, to provide responsive service within the constraint of finite size, only the web pages most likely to be requested soon again by the browsers 110A through 110N are kept in the cache 150. However, the collection of web pages kept in the cache 150 must change when the demands of the clients 100A through 100N change, and the browsers 110A through 110N begin to request web pages that are not then held in the cache 150.

Figure 2:
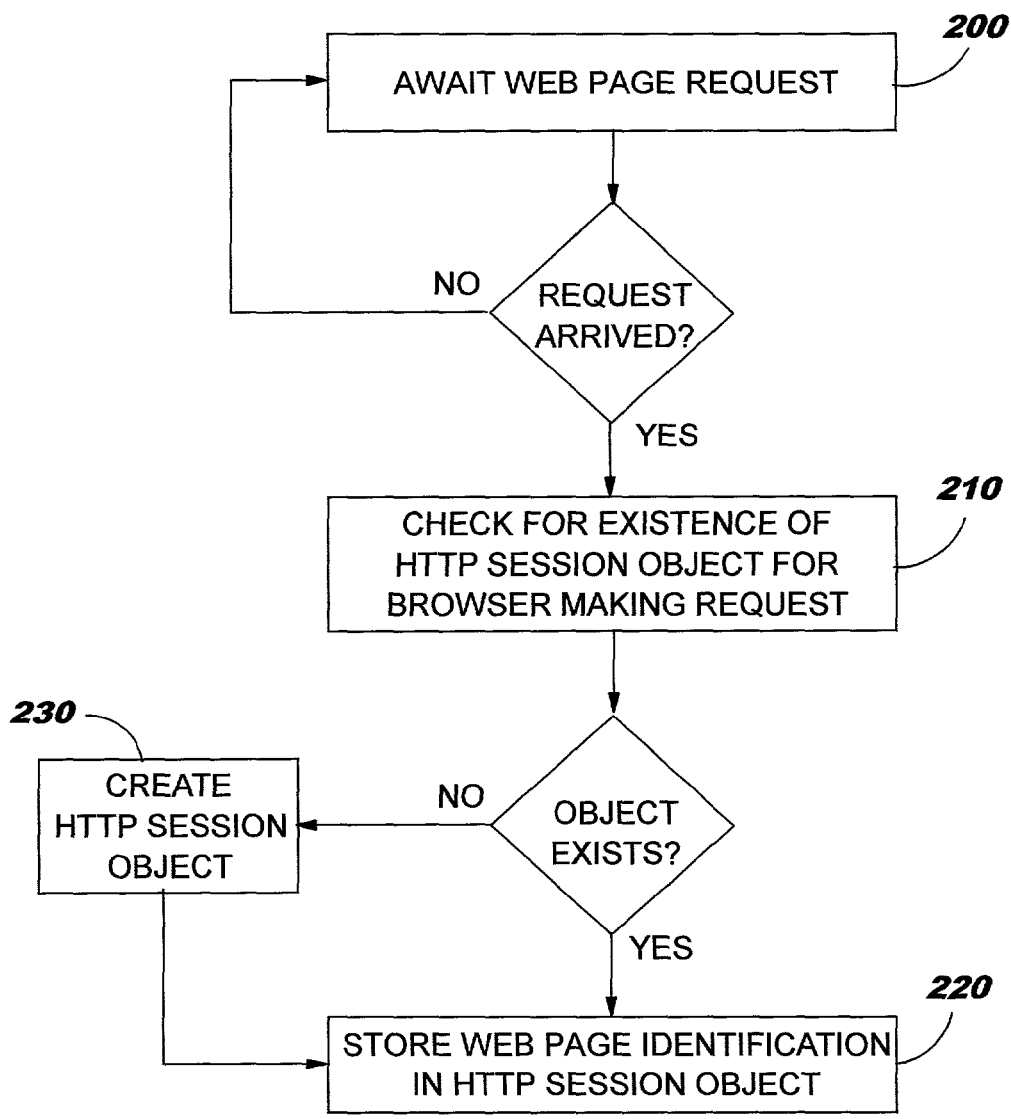
FIG. 2 shows aspects of the operation of the web server of FIG. 1 concerning the gathering of session data.

Session data may be kept and analyzed in order to detect changes in the demands of the clients 100A through 100N that necessitate changes to the web pages kept in the cache 150. FIG. 2 shows how session data may be kept, according to the present invention. The server 130 waits for a web page request from one of the browsers 110A through 110N (step 200). When a request is received, the server 130 determines whether an HTTP session object exists for the browser (step 210). HTTP session objects reside within memory of the server 130, and are associated with the browsers 110A through 110N by cookies, or, for browsers that do not support cookies, by URL rewriting. An HTTP session object may include a number of attributes, including a session ID that identifies the browser with which the session object is associated. More generally, the HTTP session objects enable session tracking, which is a mechanism through which the servlets 140A through 140M maintain information about the requests of the browsers 110A through 110N. Ordinarily, sessions are shared among the servlets 140A through 140M that are accessed by the browsers 110A through 110N, although this is not a necessary condition of the present invention.

As shown in FIG. 2, when an HTTP session object exists for a browser 110A through 110N that has requested a web page, the identification of the requested web page is written into the HTTP session object that is associated with the browser 110A through 110N that made the request (step 220). In one embodiment of the invention, the identification of the requested web page is written into a first-in-first-out queue with a capacity of five web page identifications, so that the last five web pages requested by a browser are included in the browser's HTTP session object. The server then awaits another web page request (step 200).

Otherwise (i.e., an HTTP session object does not exist for the browser), the server creates an HTTP session object for the browser 110A through 110N that is requesting a web page (step 230), writes the identification of the requested web page into the HTTP session object just created for the browser 110A through 110N that made the request (step 220), and awaits another web page request (step 200).

Figure 3:
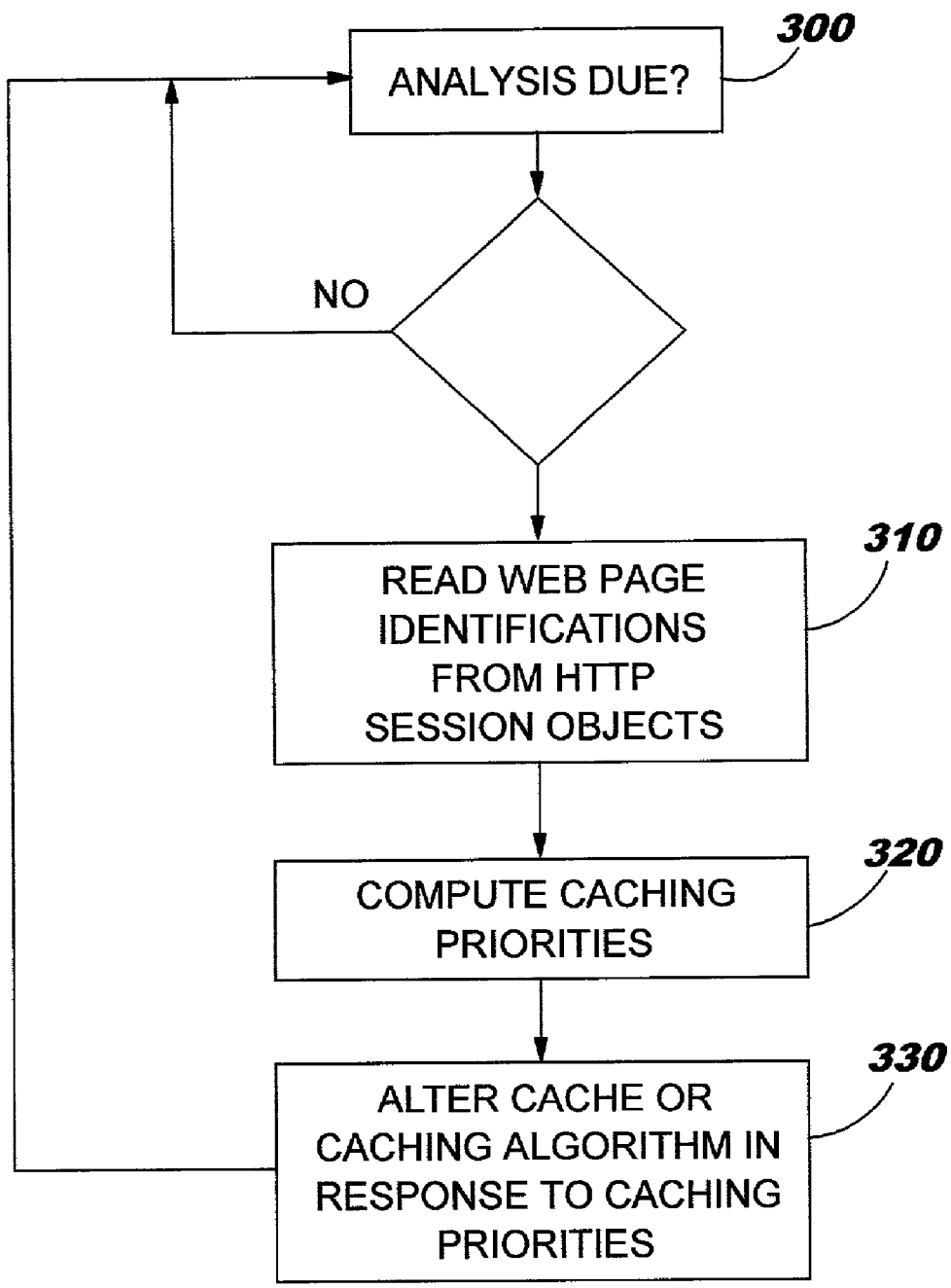
FIG. 3 shows aspects of the operation of the web server of FIG. 1 concerning the analysis of session data.

As shown in FIG. 3, statistics of the identifications of the requested web pages are analyzed from time to time. Analysis may be undertaken periodically, for example upon the expiration of a timer or upon the arrival of a predetermined number of web page requests, or the analysis may be undertaken in response to a triggering event, for example a command from an operator, or an interrupt from an external source, or an abrupt change in the behavioral characteristics of the browsers 110A through 110N as evidenced by an abrupt change in the arrival rate of requests for web pages. The purpose of the analysis is to determine a set of caching priorities, so that the contents of the cache 150 or the operation of an associated caching algorithm may be altered in order to provide more responsive service.

The server 130 determines as described above whether analysis is needed (step 300). The identifications of web pages requested by the browsers 110A through 110N are read from the HTTP session objects (step 310). From these identifications, caching priorities are computed (step 320). In one embodiment of the invention, the identifications of the requested web pages are ranked, for example from most-frequently requested to least-frequently requested, and caching priorities are assigned according to this ranking. In another embodiment of the invention, the identifications of the web pages are ranked from most-recently requested to least-recently requested, and caching priorities are assigned according to this ranking. Segments of the cache may then be re-loaded so that the cache contains the web pages that have the highest caching priorities, or the caching algorithm may be altered, for example by selecting a new caching algorithm (step 330).

From the foregoing description, those skilled in the art will recognize that the present invention enables an Internet web server to track nearly instantaneous changes in demands and to adapt by quickly reconfiguring its resources, thereby to provide the most responsive services possible. The foregoing description is illustrative rather than limiting, however, and the invention is limited only by the following claims.

We claim:

1. A method for adapting to change in a demand on a web server, comprising:
   determining whether HTTP session objects exist for browsers, wherein the HTTP session objects enable session tracking;
   associating session tracking objects with the browsers that access a web server, wherein the session tracking objects include identifications of web pages requested by the browsers; and
   if an HTTP session object does not exist for one of browsers which requested one of the web pages, creating with the web server an HTTP session object for the browser; and
   analyzing the identifications of web pages requested by the browsers to determine caching priorities for the web server.

2. The method of claim 1, wherein the identifications of web pages requested by the browsers include the identifications of a last N web pages requested by each of the browsers.

3. The method of claim 2, wherein N is five.

4. The method of claim 1, wherein the session tracking objects are HTTP session objects.

5. The method of claim 1, wherein the caching priorities are proportional to relative frequencies of browser requests for web pages.

6. The method of claim 1, wherein the caching priorities are proportional to recency of browser requests for web pages.

7. The method of claim 1, wherein the act of analyzing is performed periodically.

8. The method of claim 1, wherein the act of analyzing is performed in response to a triggering event.

9. The method of claim 1, wherein the method ensures that a web site adapts to changes in demand.

10. The method of claim 1, further comprising utilizing servlets to associate each user with a session tracking object of the session tracking objects.

11. The method of claim 1, further comprising utilizing servlets to maintain information about requests of the browsers.

12. The method of claim 1, further comprising determining whether an HTTP session object exists for one of the browsers.

13. The method of claim 1, further comprising writing into an HTTP session object that is associated with one of the browsers an identification of a requested web page.

14. The method of claim 1, wherein:
   the identifications of web pages requested by the browsers include a first-in-first-out queue including identifications of a last N web pages requested by each of the browsers;
   the analyzing is performed upon at least one of an expiration of a timer, an arrival of a predetermined number of web page requests, a command from an operator, an interrupt from an external source, and an abrupt change in behavioral characteristics of the browsers; and
   the method further comprises altering at least one of contents of a server cache and a caching algorithm based on the determined caching priorities such that the server cache contains the web pages that have the highest caching priorities.

15. A method for adapting to change in a demand on a web server, comprising:
   determining whether HTTP session objects exist for browsers, wherein the HTTP session objects enable session tracking;
   associating session tracking objects with the browsers that access a web server, wherein the session tracking objects include identifications of web pages requested by the browsers;
   if an HTTP session object does not exist for one of browsers which requested one of the web pages, creating with the web server an HTTP session object for the browser;

analyzing the identifications of web pages requested by the browsers to determine caching priorities for the web server; and altering a server cache responsive to the caching priorities.

16. The method of claim 15, wherein the act of altering further includes re-loading at least part of the server cache.

17. The method of claim 15, wherein the act of altering further includes altering a caching algorithm associated with the server cache.

18. The method of claim 15, further comprising one of:
utilizing servlets to associate each user with a session tracking object of the session tracking objects; and
utilizing servlets to maintain information about requests of the browsers.

19. The method of claim 15, further comprising determining whether an HTTP session object exists for one of the browsers.

20. The method of claim 15, further comprising writing into an HTTP session object that is associated with one of the browsers an identification of a requested web page.

21. The method of claim 15, wherein:
the identifications of web pages requested by the browsers include a first-in-first-out queue including identifications of a last N web pages requested by each of the browsers;
the analyzing is performed upon at least one of an expiration of a timer, an arrival of a predetermined number of web page requests, a command from an operator, an interrupt from an external source, and an abrupt change in behavioral characteristics of the browsers; and
the method further comprises altering at least one of contents of a server cache and a caching algorithm based on the determined caching priorities such that the server cache contains the web pages that have the highest caching priorities.

22. A method for adapting to change in a demand on a web server, comprising:
determining whether HTTP session objects exist for browsers, wherein the HTTP session objects enable session tracking;
associating session tracking objects with the browsers that access a web server which includes a plurality of servlets, a caching algorithm, and a fast memory cache, wherein the session tracking objects include identifications of web pages requested by the browsers;
if an HTTP session object does not exist for one of browsers which requested one of the web pages, creating with the web server an HTTP session object for the browser;
analyzing the identifications of web pages requested by the browsers to determine caching priorities for the web server; and
altering a server cache responsive to the caching priorities,
wherein the method ensures that a web site adapts to changes in demand.

23. The method of claim 22, wherein:
the identifications of web pages requested by the browsers include a first-in-first-out queue including identifications of a last N web pages requested by each of the browsers;
the analyzing is performed upon at least one of an expiration of a timer, an arrival of a predetermined number of web page requests, a command from an operator, an interrupt from an external source, and an abrupt change in behavioral characteristics of the browsers; and
the method further comprises altering at least one of contents of a server cache and a caching algorithm based on the determined caching priorities such that the server cache contains the web pages that have the highest caching priorities.

* * * * *